Feb. 1, 1955

O. M. ROWE ET AL 2,700,827

PRECISION CUTTING TOOL SETTER

Filed Dec. 1, 1952

INVENTORS
Orville M. Rowe
Frederick Wood
BY Arnold C. Gayne
Wooster & Davis ATTORNEYS

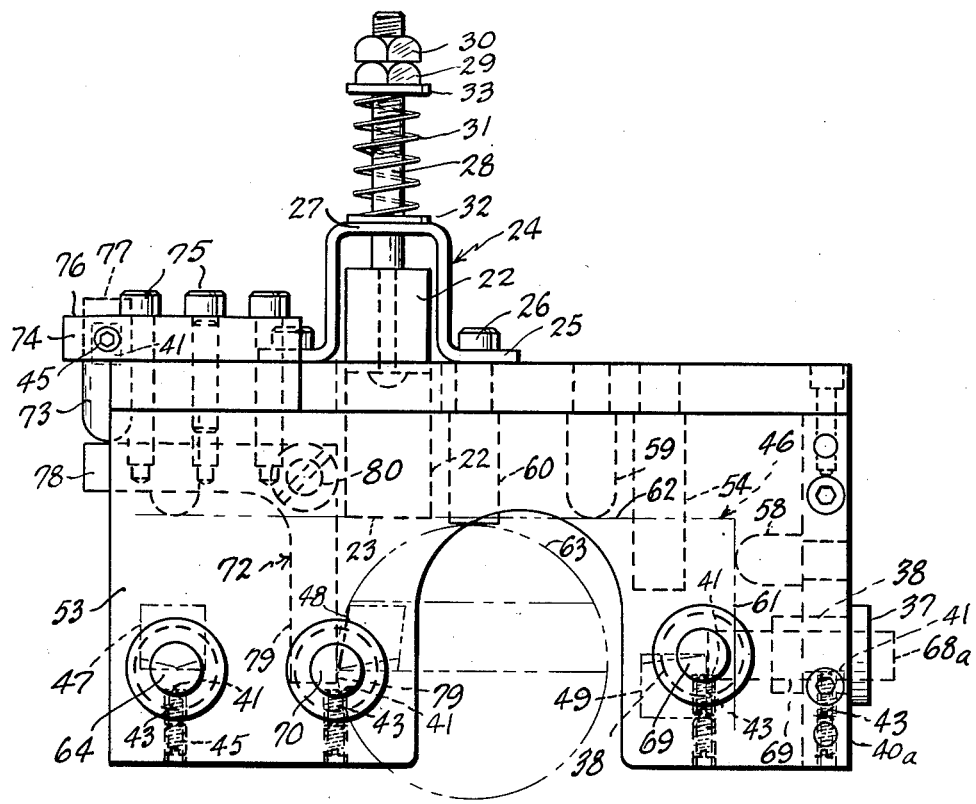
Fig. 5.
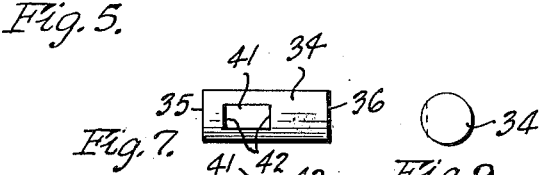
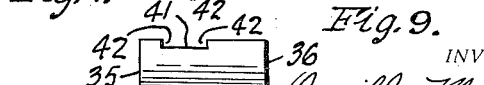
INVENTORS
Orville M. Rowe
Frederick Wood and
Arnold C. Gayne
BY Wooster & Davis Attys.

United States Patent Office 2,700,827
Patented Feb. 1, 1955

2,700,827

PRECISION CUTTING TOOL SETTER

Orville M. Rowe, Elkhart, Ind., and Frederick Wood, Milford, and Arnold C. Gayne, Bridgeport, Conn., assignors to The Leander Corporation, a corporation of Connecticut Application December 1, 1952, Serial No. 323,492

10 Claims. (Cl. 33—185)

This invention relates to a precision cutting tool setter, and has for an object to provide an improved form of tool setter for accurately and quickly setting or locating one or more cutting tools or bits in a tool holder without removing the holder from the machine.

It is also an object to provide a tool setter which will permit rapid duplication of simple and complicated cutting tool set-ups on both semi-automatic and automatic machines, with a minimum of interference with production.

Another object is to provide a tool setter which makes the replacement of tool bits, and holding of them to close tolerances, practical for the average operator.

A further object is to provide a tool setter for which no precision ground locating surfaces are required on the tool holder.

Still another object is to provide a tool setter in which no drilling or tapping of the tool holder, or use of mechanical clamps or similar devices, are required for securing the setter in place on the tool holder during the operation of setting and locating the cutting tools or bits.

With the foregoing and other objects in view, we have devised the construction illustrated in the accompanying drawings forming a part of this specification. It is, however, to be understood the invention is not limited to the specific details of construction and arrrangement shown, but may embody various changes and modifications within the scope of the invention.

In these drawings:

Fig. 5 is a side view of a further form of the device;

Figs. 7, 8 and 9 are a plan, side and end view respectively of one of the gauge pins.

Figures 1, 2:
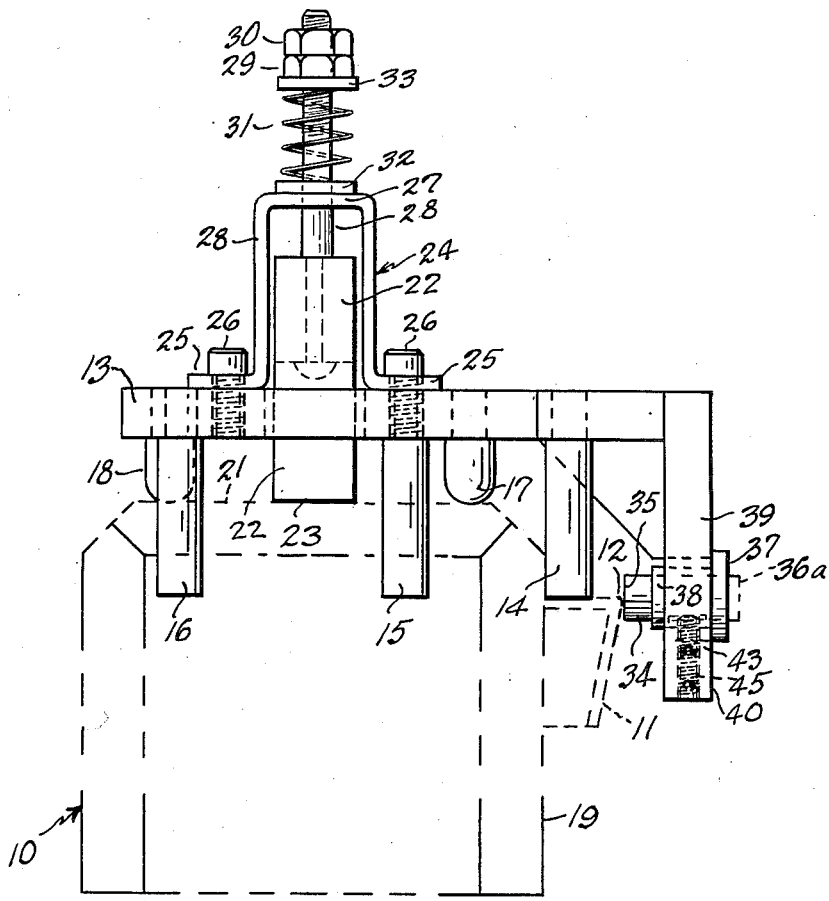
Fig. 1 is a side view of the tool holder with one form of this setter shown in use therewith.
Fig. 2 is a detail section showing the means of mounting a gauging pin.
Figure 3:
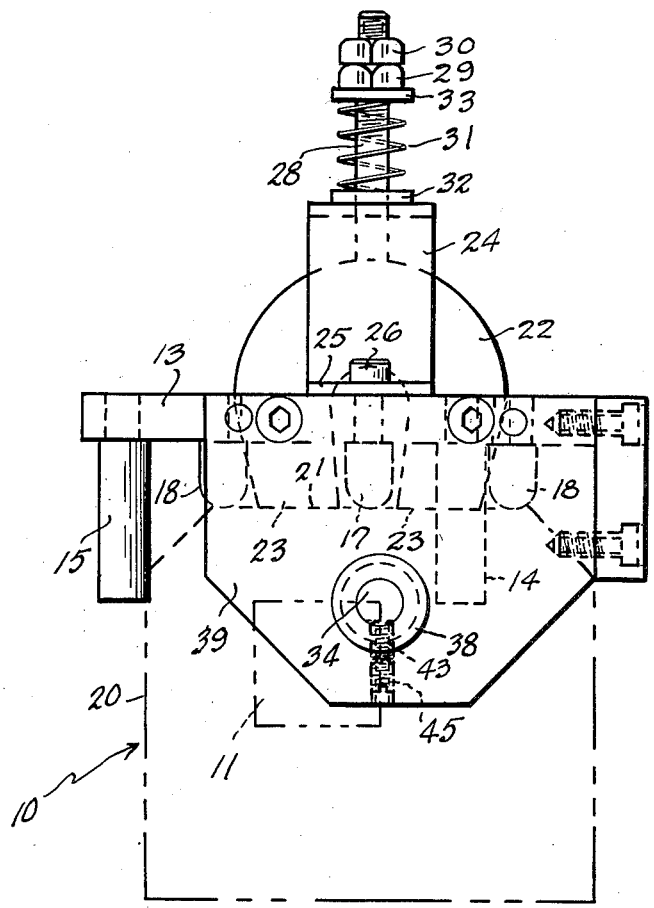
Fig. 3 is a side view looking from the right of Fig. 1.
Figure 4:
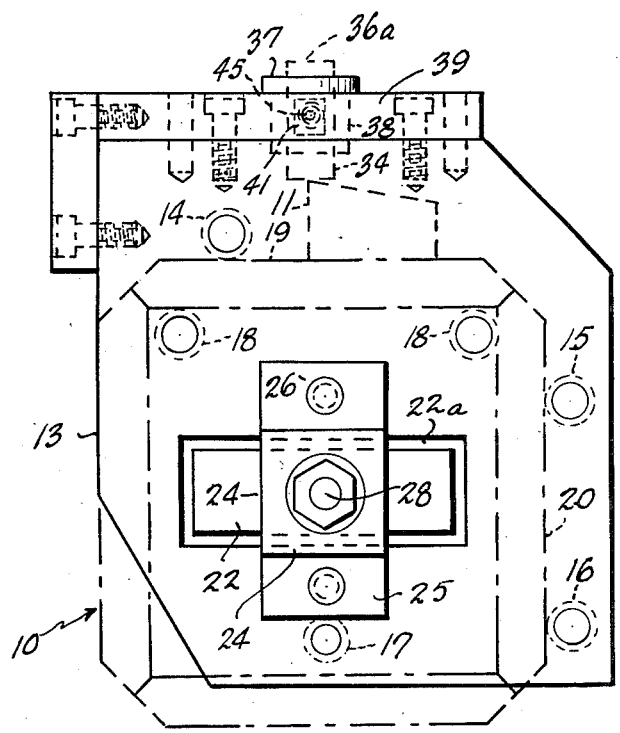
Fig. 4 is a view looking toward the top of Fig. 1 turned ninety degrees counterclockwise.

Referring first to the form of Figs. 1 to 4, a tool holder is shown in broken lines at 10, merely the outline shape of this holder being indicated, without showing the details of construction, as such a holder forms no part of the present invention. This indicates merely as an example for the purposes of describing the invention, one form of tool holder with which this tool setter can be used, and this holder is shown as carrying any usual or standard type of tool such, for example, as a cutter or bit 11 adjustably mounted in the holder by any of the usual adjusting and securing means, the cutting edge of this tool being indicated at 12.

The tool setter comprises broadly a support, which may be a body or plate member, on which are mounted three points of location to engage three different surfaces of the tool holder arranged in different planes or at different angles to each other to locate the setter in position on the holder, with one or more magnets operating through a spring to retain the setter on the tool holder during the operation of locating and setting the tools, such, for example, as cutters and bits, in the holder, thus leaving both hands free for the tool setting operation; together with a gauging pin, which is accurately positioned and dimensioned with respect to gauging surfaces and can be used to accurately locate the tools, such as cutters or bits, in the tool holder, and in which a predetermined setting of the tool can be easily, quickly and accurately duplicated, as many times as required. These operations can be performed without removing the tool holder from the machine.

One of the simpler forms of the device is shown in Figs. 1 to 4. This form comprises a support in the form of a body or plate 13 carrying a series of locating members comprising locating stops or stop legs 14, 15 and 16 and locating buttons or locating pins 17 and 18 arranged to engage different surfaces of the tool holder 10, which are at angles to each other or in different planes, and in effect these stops and buttons constitute three points for accurately locating the tool setter with respect to the holder, one being represented by the stop 14, another by the stops 15 and 16, and the third by the buttons 17 and 18. In the arrangement shown, the stop 14 is arranged to engage a side wall 19 of the holder with the stops 15 and 16 engaging another side wall 20 of the holder at an angle to the side wall 19 and in a different plane, and the buttons 17 and 18 to engage an end wall 21 of the holder, in another plane arranged at an angle to both of the side walls 19 and 20, and the device is held in the position shown with the stops and buttons engaging the walls as indicated by means of a permanent, relatively strong magnet 22. This is preferably a horseshoe magnet located in and extending through an opening 22a in the plate, with the two poles 23 located below the body 13 and having contact surfaces in the same plane to engage a wall of the tool holder 10, in this case the end wall 21. The magnet may be mounted in any suitable manner on the body member, but a simple and effective means, as shown in the drawing, comprises a support 24 in the form of a flat metal strip bent to substantially inverted U shape with outwardly extending feet 25 at the free ends of the laterally spaced legs whereby the support can be secured to the body 13 by any suitable means, such, for example, as socket head screws 26. The connecting bar 27 at the upper end is provided with an opening for passage of the stud 28 secured at its lower end to the magnet and threaded at its upper end to receive an adjusting nut 29 and lock or jam nut 30. Embracing the stud is a coil spring 31 between washers 32 and 33, the first of which rests on top of the support 24, and the second on the under side of the nut 29. By this arrangement the magnet holds the setter against the tool holder 19 through the spring 31 and therefore through a uniform pressure which prevents drawing the setter out of position, which might occur if mechanical clamps were used which had to be set up by hand, as variations in the pressures involved in setting it up might draw the setter out of position so that in successive applications of the setter to the tool holder it would not necessarily be located in the same position. With this improved holding means, where the force of the magnet acts through the spring, the successive positioning of the setter on the tool holder will be the same, giving more accurate successive locatings of the tool. The pressure of the spring can be adjusted by means of the nut 29 and the adjustment maintained by means of the jam or lock nut 30. With this arrangement, therefore, the locating stops 14 to 16 and the locating buttons 17 and 18 provide a plurality of locating surfaces on the body member located in different planes to engage a plurality of different surfaces of the tool holder, which may also be in different planes at right angles to each other, to properly locate and position the setter on the tool holder, and these locating surfaces are held firmly in engagement with the surfaces of the tool holder by action of the magnet through the spring 31.

The tool setter includes gauging means on the body member for locating the tool in the holder when the setter is so positioned and held on the tool holder. In the form of Figs. 1 to 4 this gauging means comprises a gauging pin 34 which is mounted to shift longitudinally in the body member, but is held against turning, and although it may shift or is mounted to float longitudinally, means is provided to prevent its falling out of its holding means in the body member. This pin is ground off square at its opposite ends to provide gauging surfaces 35 and 36, and the body member or support 13 is provided with a gauging surface to cooperate with the outer gauging surface of the pin for locating this pin. In the form shown this gauging surface on the body is indicated at 37 on the outer end of a sleeve 38 mounted in the laterally extending bracket 39 forming a part of the body member 13. If the gauging pin 34 is mounted directly in the body member without this sleeve, the gauging surface on the body member would be the surface 40 of this member. That is, the gauging pin 34 may be adjustably mounted in the body member either with or without the mounting sleeve or bushing 38, and the gauging surface on the body member co-operating with the gauging surface 36 on the pin may be located either directly on the body or on the end of the sleeve, but the use of the sleeve for mounting the pin is preferred because it can be more readily hardened, and also the end surface 37 is less and can be more easily ground accurately than can the greater surface 40 of the body member. To retain the pin 34 in position, and to prevent its turning in its mounting, it is provided with a flat surface 41 (see Figs. 2, 7, 8 and 9) on one side of less length than the pin so as to provide stop shoulders 42 at the opposite ends of the flat surface, and the pin is retained by means of a set screw 43 threaded into the body member with its inner end in the recess formed by the flattened surface. The flattened surface 41 is of a length such that the shoulders 42 are spaced apart a sufficient distance to permit necessary adjustment of the pin 34 for the gauging operation.

In use of the device, the tool bit 11 is adjusted and set in the holder in position to produce a part according to specifications within allowable tolerances. After this is done, a work piece may be turned up or finished to check to see if it is of proper dimensions, and thus to determine whether the tool is properly set in the holder. If it is found to be correct, then this tool setter is placed on the holder 19, making sure that the locating stops 14 to 16 and the locating buttons 17 and 18 are in contact with the proper surfaces of the holder, and the magnet will then hold the unit in position with spring pressure, eliminating any tendency of the gauge or setter to move out of position, such as might happen with other clamping methods, particularly mechanical clamps. Then the inner end 35 of the gauge pin 34 is brought against the cutting edge 12 of the tool bit or cutter 11 and locked in position by the set screw 43 set up against the flat surface 41. The pin 34 is made long enough so that in this position its outer end projects somewhat beyond the gauging surface 37 (or the gauging surface 40 if no mounting sleeve is used) as indicated by the dotted line portion 36a. The tool setter is now removed from the tool holder and this projecting end portion 36a is ground down even or flush with the gauging surface 37 (or the gauging surface 40 if the mounting sleeve is not used) while the pin is still clamped in this position. This thus creates a built-in master for setting an indicator to zero, such, for example, as a dial type of indicator gauge. The retaining set screw 43 is now loosened or retracted an amount, as indicated at 44, Fig. 2, sufficient to permit the gauge pin to float or shift longotudinally as required, but not to turn or shift radially. This screw may be locked in this position by setting behind it an additional set screw 45 jammed against the outer end of the screw 43. The shoulders 42, as indicated, are spaced sufficiently to permit sufficient longitudinal shifting of the pin, but will cooperate with the end of the screw 43 to prevent the pin from dropping out of its mounting. This setter has now become the master for setting all future tools for this same operation.

To replace broken or worn tools, this tool setter, with the gauge pin 34 so ground, is simply replaced on the holder 19, as described above, with the locating stops 14 to 16 and locating buttons 17 and 18 engaging the different surfaces of the holder 19, as indicated above. Then the tool 11 is adjusted until the outer end 36 of the gauge pin 34 is flush with the gauging surface 37 or 40 as the case may be. This may be done either by feel, or by means of an indicator, depending on the tolerances necessary. Should, for example, the tool become slightly worn so as to be cutting to the low tolerance limit, the indicator may be set to zero on the ground gauging surface 37 (or 40 as the case may be) and the indicator may then be moved over the end of the gauge pin 34 and the tool shifted while engaging the inner end 35 to bring the outer end 36 to zero reading on the indicator. After the tool is clamped in the adjusted position the machine is now ready to resume operation to produce the part to the allowed tolerances. If it should be desired to set the tool, say, for example, .001 inch either larger or smaller, this can be readily determined and will be indicated on the indicator, and the tool set accordingly.

Figure 6:
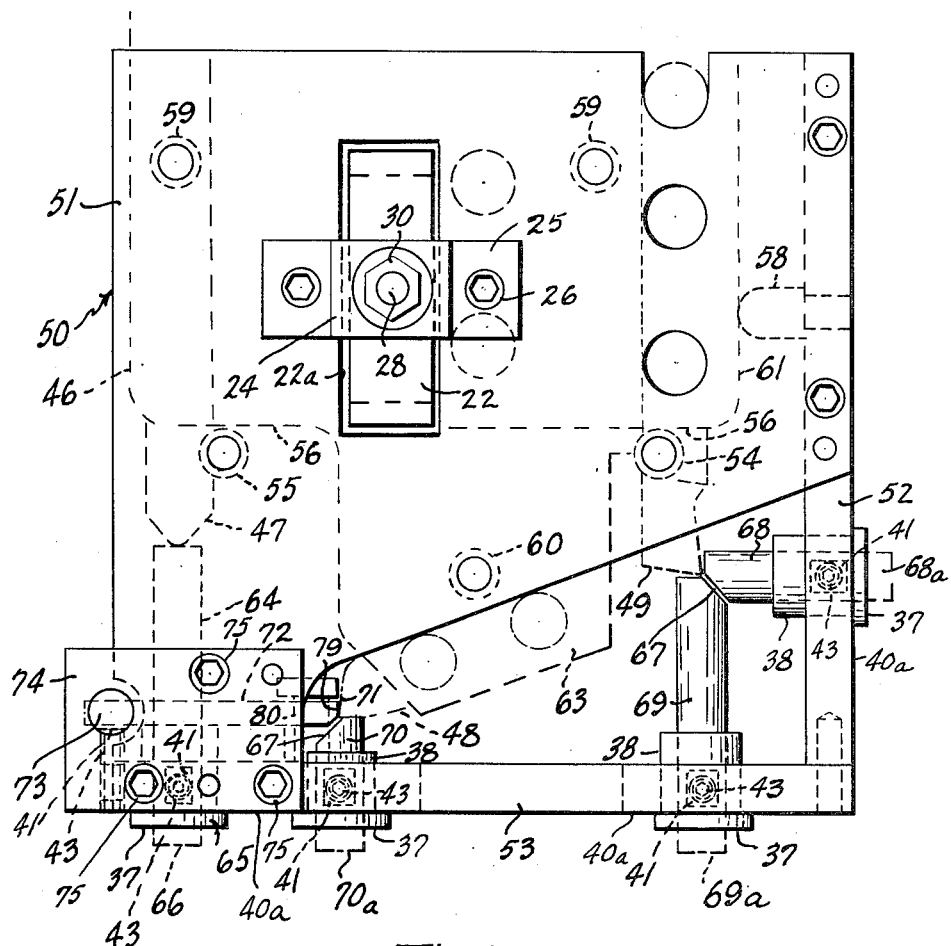
Fig. 6 is a top plan view of the device of Fig. 5.

The form shown in Figs. 1 to 4 indicates a simple form of the device as used for locating a single tool or bit in a tool holder, as described, but the device is readily adapted and employs the same principle for locating more than one cutter or tool in a holder, or in locating the tools in more complicated tool holders and tool settings, and the device is readily adapted for setting tools in such holders. An example of a setter designed for a more complicated arrangement of tools is shown in Figs. 5 and 6. This setter is designed for locating and setting a plurality of tools or cutters in a tool holder, but employs the same principle and method of operation as that of the simpler form of Figs. 1 to 4. In these figures the tool holder is indicated at 46 carrying a plurality of tools or cutters 47, 48 and 49, each adjustable in the holder to properly position it therein and having securing means (not shown) for clamping them in their adjusted positions. With this arrangement the tool setter has the locating stops and locating buttons the same as in the first form, providing the three locating surfaces or points located in different planes to engage different surfaces of the tool holder to position the setter on this holder for the gauging operation, one or more magnets to retain the setter in this position, and gauging pins or similar means shiftable in the body to engage the proper surfaces on the tool or bit to be located, and the operation of making the master gauge and adjusting and setting the gauging means and thereby the tools, is the same as in the first form.

This setter, as shown in Figs. 5 and 6, comprises a support or body member 50 including a plate 51 and laterally extending brackets or plates 52 and 53 secured thereto and to each other, and at right angles to each other. In this case, locating stops 54 and 55 are carried by the plate 51 to engage the front or end surface 56 of the holder 46, and locating buttons 58, 59 and 60 engage the side surface 61, the top surface 62 of the body and the top of the circular extension 63 respectively, to thus properly locate the setter on the tool holder, and it is held in this position by the magnet 22, the same as in the first form. The mounting and arrangement of this magnet is the same as in the first form and therefore the same reference characters are used to designate the corresponding elements.

Gauging means for setting the individual tools or cutters 47, 48 and 49 are mounted in the body member. Where the tool is easily accessible floating gauge pins like that shown at 34 in the first form may be used, but where the tool is relatively inaccessible, or where a locating surface on the tool cannot be engaged directly by one of these gauging pins, an intermediate element may be used forming a part of the gauging means for that tool, and located between the tool and the gauging pin also forming a part of this gauging means. Thus, a gauging pin 64 is used for gauging and locating the tool 47. This is the same as gauging pin 34, except it is longer, and is used in the same way. It is mounted in a sleeve 65 mounted in the plate or bracket 53 in which the pin 64 is located in alignment with the tool 47, and the pin is of a length to project, as indicated in dotted lines 66, somewhat beyond the gauging surface 37 to be ground off flush with this surface 37 after tool 47 has been properly set, as described in connection with the first form. The pin 64 has the flattened surface 41 to be engaged by the set screw 43 during the grinding operation, after which this set screw is loosened and set by a jam screw 45, as previously described.

The same setting and locating means may be used for the tool 49, except in this case this tool is to be set both longitudinally and laterally. Therefore a gauging pin 68 is employed to engage a side of the tool for setting it laterally, and a gauging pin 69 set to engage the end of the tool is used for longitudinal setting of the tool. Both these gauging pins are mounted and secured as shown in Fig. 2 for the first form, and the operation of setting and grinding off the projecting ends 68a and 69a flush with the gauging surface 37 (or 40a if no sleeve or bushing 38 is used) for the master gauge is the same as described in the first form. If the pins 68 and 69 are located so that they would interfere if the inner ends were circular, they may be beveled off for clearance, as indicated at 67.

For setting the tool 48, however, both laterally and longitudinally, the lateral adjustment is secured by a gauging pin 70 similar to the gauging pins already described, and this is mounted and used in the same manner as described for the other gauging pins; the projecting end 70a being ground off flush with the gauging surface 37 (or 40a if no bushing is used for mounting the pin) for the master gauge, the same as in the other form. For longitudinal adjustment of this tool, however, the end surface 71 is relatively inaccessible so as to be difficult for the use of a gauging pin to directly engage this end of the tool, as in this example the gauging pin 64 for the tool 47 is in alignment with the tool 48 and therefore such a gauging pin could not be readily used. Therefore an intervening element is used to engage the end of the tool 48. In the form shown, the gauging means for this tool comprises a pivoted bell crank lever 72 and the floating gauging pin 73, this pin being mounted in the body 50 either by mounting it in the body plate 51 or, as in the specific example shown, it is mounted in a separate block 74 mounted on and projecting from the plate 51, it being secured to this plate by any suitable means, such, for example, as the socket screws 75. This pin 73 is mounted to float in this block 74 the same as are mounted the other gauging pins, and as shown for example in Fig. 2, except that in this case the pin is mounted directly in the block 74 instead of in the mounting sleeve or bushing 38 (although such a sleeve could be used the same as for the other gauging pins) and the top surface 76 of this block constitutes the gauging surface to which the projecting end 77 of the pin is ground flush after being set for the master gauge. As the lower end of this pin 73 cannot directly engage the tool 48, it engages the top of one arm 78 of the bell crank lever 72, the other arm 79 engaging the end 71 of the tool 48. This lever is pivotally mounted in the plate or bracket 53 by any suitable means such, for example, as the pivot stud or screw 80. It will therefore be seen that with this arrangement the gauging means for the tool 48 includes the floating gauging pin 73 which is set and ground off the same as the other forms of gauging pins, but instead of the inner end of this pin directly engaging the end of the tool, the tool locating and engaging effect is secured by this pin acting through the bell crank lever 72, but the effect and operation are the same as if the pin 73 directly engaged the tool.

It will be understood from the above that this tool setter may be designed and built to fit any tool holder, and when used with the holder for which it is designed can be used to accurately set the tools in the holder without removing the tool holder from the machine, thus greatly reducing the time in which the machine is not producing, also that no drilling or other operations are required on the tool holder for clamps or other securing means for holding the tool setter, greatly simplifying the operation of locating the tool setter on the tool holder; also, the magnet operating through the spring always provides the same pressure for holding the tool setter against the tool holder for all successive uses and applications of the setter to the holder, insuring much greater accuracy in successive settings of the tool. As each setter is designed for each tool holder, after once being set and the gauging pins set and ground to the proper gauging surfaces, successive or worn tools can be readily, quickly and accurately set to the proper position by the average operator, and these operations can be more accurately, quickly and properly performed by the operator as the setter is so held as to leave both hands free for the tool gauging and setting operation. Further, it will be seen that no precision ground locating surfaces are required on the tool holder, as the locating stops and buttons cooperate with the normal surfaces of the tool holder for locating this tool setter, and this gauge or tool setter may fit or cooperate with irregular surfaces on the tool holder for properly locating this gauge. In short, it is designed for and permits rapid duplication of either simple or complicated cutting tool set-ups on production machines or production runs, and makes possible replacements of and location of tools holding to close tolerances without removing the tool holders from the machine, thus reducing to a minimum the time the machine must be shut down or idle for the tool setting operation.

Having thus set forth the nature of our invention, we claim:

1. A method of setting a cutting tool in a holder comprising the steps of mounting a tool in the holder and setting it to process a work piece to size within permissible tolerances, securing on the holder a setter comprising a body, a plurality of locating surfaces positioned on the body in different planes to engage a plurality of surfaces on the holder in different planes to locate the setter on the holder, which body has a gauging surface and a pin mounted in the body for longitudinal movement with its outer end extending beyond said surface, shifting the pin to bring its inner end against the set tool, clamping the pin in this position, removing the setter from the holder and grinding the projecting end of the pin flush with the gauging surface on the body, releasing the pin so that it is free to shift longitudinally in the body, placing the setter in the same position on a holder in which a tool is to be correspondingly set, bringing the tool against the inner end of the pin and shifting the tool and pin until the outer end of the pin is in a given position relative to the gauging surface on the body, and securing the tool in this position.

2. A tool setter of the character described comprising a body member, a gauging surface carried by the body, three locating stops and three locating buttons carried by the body located in different planes to engage a plurality of different surfaces of a tool holder located in different planes at angles to each other to position the setter on the holder, the three locating buttons being positioned at the corners of a triangle, a magnet mounted on the body in position to engage the holder to retain the setter in position and located within the triangle formed by said buttons, and a gauging means mounted to float on the body and provided with gauging surfaces, one to be located in a given position relative to the gauging surface on the body and another to engage a tool bit in the holder for positioning said bit with respect to the holder.

3. A tool setter of the character described comprising a body member, a gauging surface carried by the body, three locating stops and three locating buttons carried by the body located in different planes to engage a plurality of different surfaces of a tool holder located in different planes at angles to each other to position the setter on the holder, the three locating buttons being positioned at the corners of a triangle, a magnet mounted on the body in position to engage the holder to retain the setter in position and located within the triangle formed by said buttons, and a gauging means including a gauging pin mounted to float longitudinally in the body and provided with a gauging surface to be located in a given position relative to the gauging surface on the body, and said means also including another gauging surface to engage a tool in the holder to position the tool therein and so connected with the pin as to be located thereby.

4. A tool setter of the character described comprising a body member, a gauging surface carried by the body, a plurality of locating members carried by the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, retaining means on the body to hold the setter on the holder with the locating surfaces in engagement therewith comprising a magnet located within the triangle formed by the first three locating members and a spring between the magnet and the body so that the pull of the magnet on the body is through the spring, and gauging means mounted to shift relative to the body and provided with gauging surfaces, one arranged to be located in a given position relative to the gauging surface on the body and another to engage a tool in the holder for positioning said tool with respect to the holder.

5. A tool setter of the character described comprising a body member, a plurality of locating members carried by the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, means on the body to hold the setter on the holder with the locating surfaces in engagement therewith comprising a magnet located within the triangle formed by the first three locating members and a spring between the magnet and the body so that the pull of the magnet on the body is through the spring, a gauging surface carried by the body, and gauging means including a gauging pin mounted in the body for longitudinal movement, said pin provided with a gauging surface at one end arranged to be located in a given position relative to the gauging surface on the body to position the pin and a surface at the other end to position the tool according to said positioning of the pin.

6. A tool setter of the character described comprising a body member, three locating stops and three locating buttons carried by the body located in different planes to engage a plurality of different surfaces of a tool holder located in different planes at angles to each other to position the setter on the holder, the locating buttons being located at the corners of a triangle, a magnet mounted on the body within the triangle formed by the locating buttons in position to engage the holder to retain the setter in position, a spring between the magnet and the body so that the pull of the magnet on the body is through the spring, a gauging surface carried by the body, and a gauging means including a gauging pin mounted to float longitudinally in the body and provided with gauging surfaces at its opposite ends, one to be located in a given position relative to said gauging surface on the body to position the pin therein and the other to position a tool in the holder according to the position of the pin in the body.

7. A tool setter of the character described comprising a body member, a plurality of locating members carried by the the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, retaining means on the body to hold the setter on the tool holder with the locating surfaces in engagement therewith, said retaining means comprising a magnet, means mounting the magnet within the triangle formed by the first three locating members in position to engage the holder including a support on the body, a spring between the magnet and the support so that pull of the magnet on the body is through the spring, a gauging surface on the body, and gauging means mounted to shift relative to the body and provided with gauging surfaces, one arranged to be located in a given position relative to the gauging surface on the body and another to engage a tool in the holder for positioning the tool with respect to the holder.

8. A tool setter of the character described comprising a body member, a plurality of locating members carried by the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, retaining means on the body to hold the setter on the tool holder with the locating surfaces in engagement therewith comprising a magnet positioned within the triangle formed by the first three locating members, a support mounted on the body, a stud connected to the magnet and mounted for sliding movement in the support and positioning the magnet to engage the holder, a stop means on the stud, a spring on the stud between the stop means and the support so that pull of the magnet on the body is through the spring, a gauging surface on the body, and gauging means mounted to shift relative to the body and provided with gauging surfaces for positioning a tool with respect to the holder.

9. A tool setter of the character described comprising a body member, a plurality of locating members carried by the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, retaining means on the body to hold the setter on the holder with the locating surfaces in engagement therewith, comprising a magnet located within the triangle formed by the first three locating members and a spring between the magnet and the body so that the pull of the magnet on the body is through the spring, a gauging surface on the body, a gauging means including a gauging pin mounted to shift longitudinally in the body, said pin being provided with gauging surfaces at its opposite ends, that at one end arranged to be located in a given position relative to the gauging surface on the body and that at the other end to position a tool in the holder according to said positioning of the pin, said pin being provided with a flat surface on one side with stop shoulders at opposite ends of said flat surface, and a set screw in the holder with its inner end adjacent said surface and between the shoulders and cooperating therewith to retain the pin in the body.

10. A tool setter of the character described comprising a body member, a plurality of locating members carried by the body provided with locating surfaces located in different planes to engage a plurality of different surfaces of a tool holder to position the setter thereon, said locating members comprising three locating members positioned at the corners of a triangle to engage a surface in one plane and three stop members to engage surfaces in other planes, a magnet on the body within the triangle formed by said first three locating members in position to engage the tool holder to hold the setter on the holder with the locating surfaces in engagement therewith, a spring between the magnet and the body so that the pull of the magnet on the body is through the spring, a gauging surface carried by the body, gauging means including a gauging pin mounted in the body for longitudinal movement, said pin provided with a gauging surface at one end arranged to be located in a given position relative to the gauging surface on the body to position the pin, and a lever pivotally mounted in the body between the other end of the pin and a tool in the holder and having surfaces cooperating with the pin and tool to locate the tool in the holder according to the positioning of the pin in the body.

References Cited in the file of this patent

UNITED STATES PATENTS

| Number | Name | Date |
| --- | --- | --- |
| 304,389 | Willey et al. | Sept. 2, 1884 |
| 2,028,134 | Brubaker | Jan. 21, 1936 |
| 2,337,248 | Koller | Dec. 21, 1943 |
| 2,417,234 | Calow | Mar. 11, 1947 |
| 2,445,176 | Hoffman | July 13, 1948 |
| 2,466,185 | Stoothoff | Apr. 5, 1949 |
| 2,481,936 | Lord | Sept. 13, 1949 |
| 2,542,030 | Hoppe | Feb. 20, 1951 |
| 2,589,865 | Rivard | Mar. 18, 1952 |
| 2,597,030 | Pistoles | May 20, 1952 |